E. A. YOUNG.
SAW SET.
APPLICATION FILED JAN. 9, 1920.
1,371,534.
Patented Mar. 15, 1921.
2 SHEETS—SHEET 1.
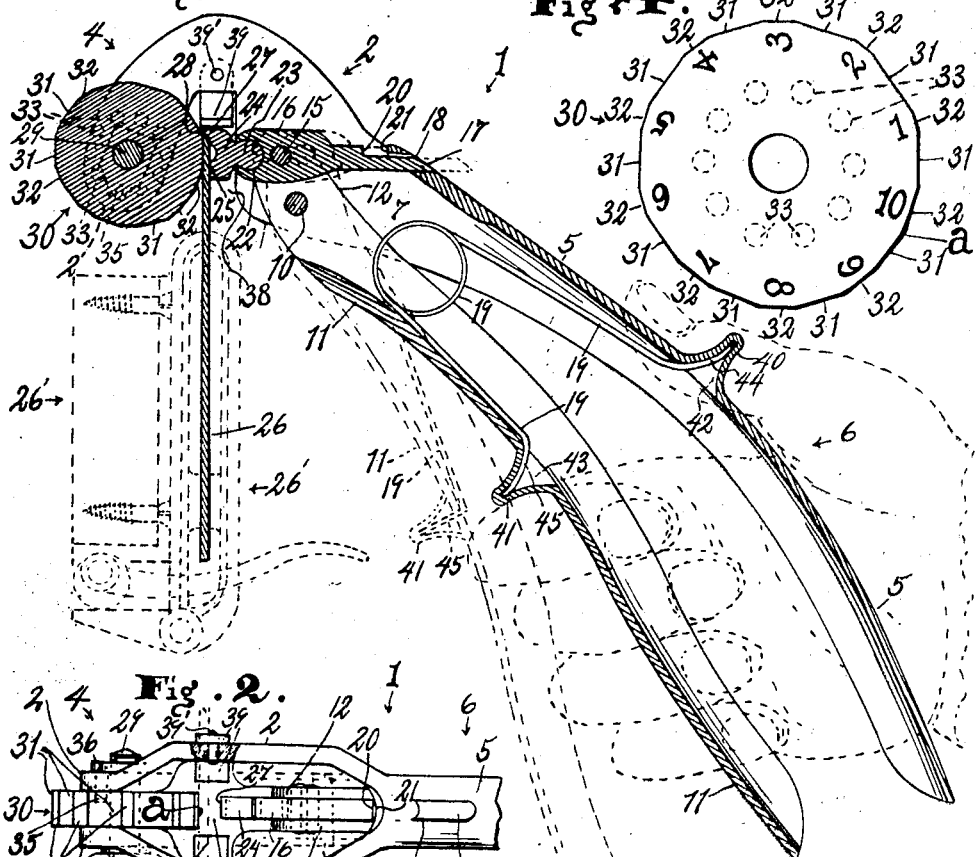
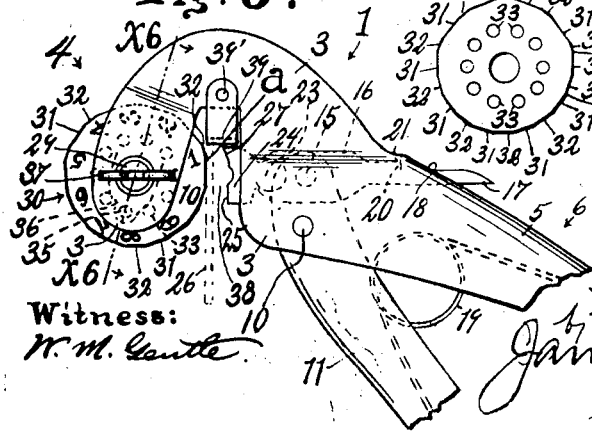
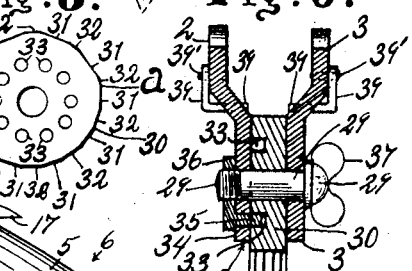
Witness:
W. M. Gentle
Inventor.
Edgar A. Young
by James R. Townsend
his atty

E. A. YOUNG.
SAW SET.
APPLICATION FILED JAN. 9, 1920.

1,371,534.

Patented Mar. 15, 1921.
2 SHEETS—SHEET 2.

Witness:
W. M. Gentle.

Inventor.
Edgar A. Young.
by James R. Townsend
his Atty

UNITED STATES PATENT OFFICE.

EDGAR A. YOUNG, OF LOS ANGELES, CALIFORNIA, ASSIGNOR TO HIMSELF AND DELPHINE ELLA YOUNG.

SAW-SET.

1,371,534.      Specification of Letters Patent.      Patented Mar. 15, 1921.

Application filed January 9, 1920. Serial No. 350,445.

*To all whom it may concern:*

Be it known that I, EDGAR A. YOUNG, a citizen of the United States, residing at Los Angeles, in the county of Los Angeles and State of California, have invented a new and useful Saw-Set, of which the following is a specification.

This invention relates to an appliance for positioning saw teeth so that they will cut a wider kerf through material than the thickness of the saw; and the invention may be said to consist in the provision of the novel features, improved construction, combination, and arrangement of parts as herein provided.

An object of invention is to provide a saw-set that an operator can use while occupying a natural position; that is this appliance is constructed so that an operator can sit or stand erect in a natural position with his tool hand below the saw teeth so that they are easily visible to him and so that he can perform his work without strain or discomfort.

Another object of the invention is to provide a saw-set with the head portion widely open at the top so that the operator's vision is unobstructed by closely assembled or shadowy parts; there being a clear view of the anvil-face and bit parts so that the operator can see to quickly move the saw-set from tooth to tooth with exactness.

A feature of the invention is the provision of a saw-set having a bit that will automatically adjust itself to the saw teeth when the hand grips are operated; that is, when the operator applies pressure to drive the bit forward to engage the saw tooth the forward portion of the plunger can move in a socket bearing to adjust its position relative to the saw tooth.

Another object of the invention is to provide a saw-set with a removable bit so that the part contacting with the saw teeth can be tempered to a hardness best suited to the work; also by having the bit removable it can be replaced easily after it has worn down.

Another feature of the invention is the provision of a saw-set with an anvil having faces that conform to saw teeth of various sizes, and means for quickly changing the position of the anvil and also positively locking it in changed position.

Another feature of the invention is the provision of a saw-set having oppositely disposed soft metal guards for engaging the saw teeth when the appliance is in operation; and I pivotally mount these guards on the saw-set head so that the saw-set can have considerable rocking movement relative to the saw without breaking or dulling the points of the teeth; also the soft metal of the guards prevents the points of the teeth from breaking or dulling.

Other objects, advantages and features of invention may appear from the accompanying drawings, the subjoined detailed description and the appended claims.

The accompanying drawings illustrate the invention.

Figure 1 is a central longitudinal section through the saw-set showing it in operation on a saw that is shown in cross section; also an unactuated open position of the bit operating lever is shown by dotted lines.

Fig. 2 is a plan of the saw-set head with a portion of a saw indicated by dotted lines; and bit shown in unactuated position.

Fig. 3 is a side elevation of the saw-set head viewed from line $x^3$, Fig. 2, a portion of the hand grip being broken away.

Fig. 4 is a side elevation of the rotary anvil enlarged to about twice its actual size.

Fig. 5 is an elevation of the other side of the rotary anvil about actual size.

Fig. 6 is a section on line $x^6$, Fig. 3.

Figure 7:
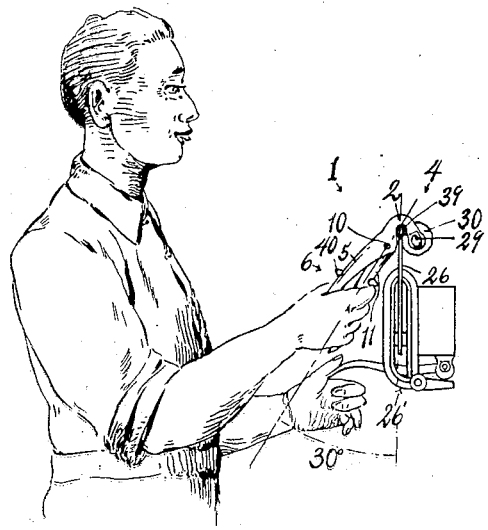
Fig. 7 is a side elevation of the saw-set showing it in actual operation and also showing the erect position of the operator and the easy natural position of his right hand and arm in operating the tool.
Figure 8:
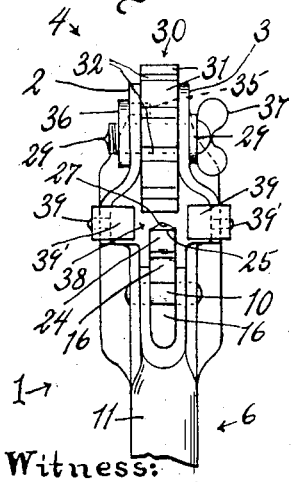
Fig. 8 is a fragmental view of the under side of the open saw-set on the scale of Fig. 3.
Figure 9:
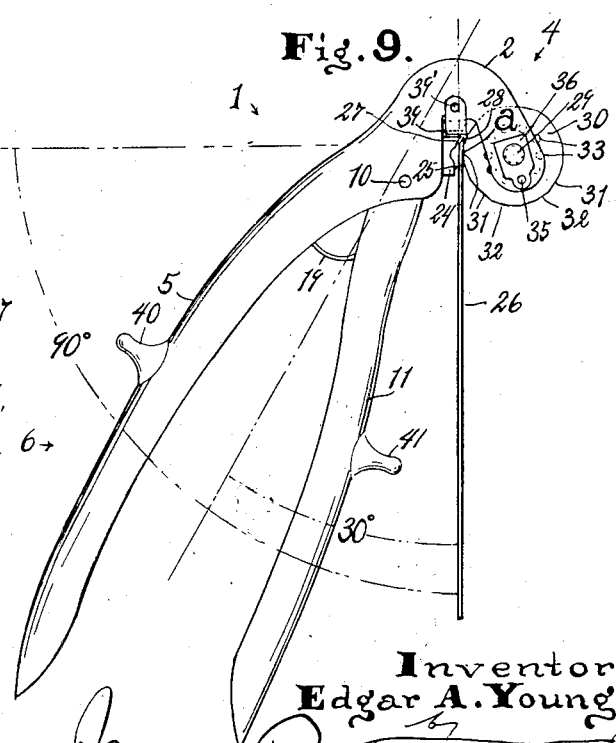
Fig. 9 is an enlarged side elevation of the saw-set as positioned in Fig. 7 showing the acute angle the saw-set occupies relative to the side surface of the saw; which angle is about thirty degrees; also showing by dot and dash lines the angle of ninety degrees in which position saw-sets are usually positioned when in operation.

In all the views except Fig. 10 the saw-set is shown in the form at present deemed most desirable and it is understood that changes may be made in various respects without departing from the spirit of the invention in other respects.

The principal parts of the saw-set 1 are stamped from sheet metal and then bent into proper shape to perform their various functions.

The extensions 2, 3 that form the bearing plates of the head 4 are stamped integral with the stationary member 5 of the hand grip 6, and these plates 2, 3 are of slightly thicker material in order to form a strong substantial bearing; these parts may however be of the same thickness throughout.

The parts 2, 3 extend forwardly from the member 5, and have secured therein a bearing pin 10 on which is pivotally mounted the bit carrying member 11 of the hand grip 6. The member 11 has extensions 12, 13 that are also slightly thickened to form a strong substantial bearing. Preferably the members 5 and 11 are handles.

In the extensions 12, 13 is secured a pin 15 on which is mounted a carrier 16 that has at one end a guide formed by a reduced portion 17 that is adapted to slide in a guideway 18 cut through the wall of the member 5 of the hand grip 6.

Secured within the members 5, 11 of the hand grip 6 is the spring 19 that normally holds the members 5 and 11 apart with the abutment 20 on the carrier 16 in engagement with the stop 21 on the member 5 and the hand grip 6 in the unactuated or open position.

The forward end of the carrier 16 is provided with a socket 22 in which is pivotally mounted the bearing end 23 of the saw setting bit or set plunger 24; and this bit is provided with a stop 25 that is adapted to engage the side of a saw 26; and a setting face 27 angularly arranged to contact with and set the saw teeth 28. By means of the construction and mounting of the bit 24 it can easily be removed from the saw-set for repair or replacing by another bit; and this bit is retained in place by the overlapping side walls 12, 13, that extend part way across the socket 22. Said carrier 16 is preferably a stamping and the socket 22 is a circular recess open at one side to accommodate a reduced portion or neck between the bearing end 23 and main body of the bit 24.

The saw 26 can be secured in a saw clamp 26' that can be of any desired form or construction and secured to any suitable support as a table or bench, not shown.

In the forward extensions 2, 3, there is secured a bearing pin 29 on which is pivotally mounted the setting anvil 30, that is provided with a plurality of gage faces which may be planes 31 adapted to receive or engage the side of the saw opposite to that which is to be contacted by the stop face 25 of the bit 24.

Preferably there are 10 of the gage or plane faces 31, although there may be a greater or less number and such faces are at equal distances from the axis of the anvil and are all tangent to a common circle having its center at such axis. At the produced intersections of these surfaces portions are cut away, leaving faces 32 that form the clearances and stops for saw teeth 28 forced out of alinement of saw blade 26 by bit 24, the setting face 27 of which is adapted to engage the saw teeth when the hand grip 6 is actuated.

The stops 32 are differently formed for different sized saw teeth, increasing in size from 1 to 10; and this increasing of size of the surface of stops 32 is accomplished by cutting away a successively greater amount of each of the points from 1 to 10, so that the center of the stop at 1 will be a greater distance from the axis of the anvil 30 than the stop at 2; and the succeeding surfaces will be successively closer to the axis of the anvil with stepped relation to each other.

One side of the anvil shown is preferably provided with numerals $a$ from one to ten by which the operator can note the size of the stops 31, 21 that will be brought into action when the saw set is used.

Means are provided for adjustment of the anvil 30 to desired position, and also for holding said anvil in requisite fixed positions so that the angle between any surface and stop face 32 can be moved into exact alinement with the root of the proposed set of the teeth of the saw. In one side of the anvil 30 there are holes 33 that correspond in number to the angles between surfaces 31 and 32, on the perimeter of the anvil; and these holes 33 are equally distant from the axis of the anvil so that when the anvil is rotated on the pin 29, the holes 33 will successively register with a hole 34 through the extension 2.

The hole 34 is so positioned that when any one of the holes 33 is in register therewith, a predetermined stop 32 is in exact position to receive the set portion of the saw tooth upon the stop on operation of the bit by means of the handles.

A locking pin 35 operating in the holes 34 and 33, hold them when the appropriate angle between the tooth holder 31 and set stop 32 is in operable position. Said pin 35 is integrally connected to a nut 36 that is adapted to fit the threaded end of the bearing pin 29 which is provided with wings 37 by which it may be turned to move the nut either toward or from the extension 2 and thereby move the locking pin 35 either into or out of one of the holes 33.

When the pin 35 is clear of the holes 34 the anvil 30 is free to be revolved on the bearing pin 29 to a position wherein a cutaway place or stop 32 conforming to the size of the saw teeth to be set is alined with the carrier pin 15 and guide 17, after which the bearing pin 29 can be turned to lock the anvil 30 in position as heretofore described.

The extensions 2, 3, form a recess to receive the toothed edge of the saw and to this end they first extend upward and outwardly from the handle 5, and then forward and finally inward and downward; so that between the upward and downward extending parts there is formed the recess or opening 38 on the under side of the head 4 into which the toothed edge of the saw is received during the saw setting operation.

Depending tooth gaging guards 39 are pivotally connected to the head of the tool by pins 39' and are preferably formed of soft metal and adapted to contact with the points of the teeth of the saw to gage the length of the portions of the points to be set and prevent the points from becoming dulled or broken by contact with the harder metal of the saw-set; also to permit movement of the saw-set in operation without dulling or breaking the points of the saw teeth.

The members 5 and 11 of the hand grip 6 are provided with the thumb and finger guards 40, 41 respectively that assist the operator in maintaining a firm hold of the hand grip and these parts can be applied to the members 5 and 11 by any well known means; being preferably struck up or pressed out integrally with these members.

Recesses 42, 43 are formed in the walls of the members 5 and 11 and into these recesses are extended the bent ends 44, 45 of the spring 19 by which means the spring is secured to the saw-set.

In operation the anvil 30 is so set that an angle $a$ between two faces 31 and 32 will be in parallelism with the root or bend of the saw tooth to be set. Then the anvil 30 will be locked in place as heretofore described; and the saw-set may then be operated in the usual way except that the operator's hand clasping the saw-set hand grip assumes an easy natural position as illustrated in Fig. 7.

In moving the tool into position for operation, on the saw teeth, and from tooth to tooth as the work proceeds, the sharp points of the saw teeth are received by the oscillating soft metal guards 39 that allow considerable movement of the saw-set head after it is in place on the sharp points of the teeth. Dulling of the teeth by scraping the tool along on the tips of the teeth is largely avoided.

In this new form of anvil the saw blade contacting and the saw tooth stopping faces are so constructed that the transverse traces of the faces extend in parallelism with the pivot axis of the anvil so that when the anvil is fixed to the handle therefor by means of the pin 29 and the pin 35 in holes 34 and 33, the appropriate faces are placed to receive the saw tooth and the set portion thereof as the operation of setting teeth proceeds.

Particular attention is directed to the means pivotally connected to the anvil and to the bit to move the bit toward the anvil to simultaneously act upon both saw blade and tooth to set the tooth. Such means are constituted in the form shown by the pivot connection at 22, 23 between the bit 24 and said carrier 16, the pivot 15, the carrying member 11, the pivot 10, the hand grip 6, head 4 and the pin 29. By this pivotal arrangement of the bit 24 the two faces of said bit are adjusted by pressure of the grips to the saw in such manner as to move the two faces of the bit appropriately to conform the saw blade and tooth to the coöperating faces of the anvil.

I claim:

1. A saw-set comprising an anvil having blade receiving and tooth stopping planes; a bit having planes complementary to the planes of said anvil; and means pivotally connected to the anvil and to the bit to move the bit toward the anvil to simultaneously act upon both saw blade and tooth to set the tooth.

2. A saw-set comprising an anvil having blade receiving and tooth stopping planes; a carrier; a bit pivotally connected to the carrier and having blade and tooth engaging planes complementary to those of the anvil; and means pivotally connected to the anvil and to the carrier to move the carrier and the bit toward and from the anvil.

3. A saw-set comprising an anvil having a saw blade receiving face and a saw tooth stopping face; means for holding the anvil; means in rigid relation to the anvil for holding the saw blade receiving face against a saw blade; a bit having saw blade contacting and saw tooth setting faces; and means pivotally connected to the bit and to the means for holding the anvil, and adapted to actuate the bit.

4. In a saw-set, an anvil, having a plurality of planes on said anvil that are parallel to and equal radial distances from the axis of said anvil, stops on said anvil, said stops positioned so that their radial distances from the axis of said anvil are increased step by step.

5. In a saw-set, an anvil, having a plurality of planes that are equal radial distances from the axis of the anvil and tangent to a circle touching all of said planes, stops on said anvil, said stops increasing in width and area and positioned at different radial distances from the axis of said anvil.

6. In a saw-set, a rotary anvil, having a plurality of planes that are equal radial distances from the axis of said anvil and tangent to a circle touching all of the plurality of planes, stops on said anvil formed at the intersection of said planes, said stops positioned at different radial distances from the axis of said anvil and tangent to circles of the shortest radial distances touching the face of each stop.

7. In a saw-set, a bearing pin, a rotary anvil mounted on said bearing pin, and a locking pin movable into or out of engagement with said rotary anvil by rotation of the bearing pin.

8. In a saw-set, a bearing pin, a rotary anvil mounted on said bearing pin, said anvil having a hole therein and a locking pin movable into or out of the hole in said anvil by rotation of the bearing pin.

9. In a saw-set, a bearing pin that is mounted in extensions on the hand grip of a saw-set, a rotary anvil mounted on said bearing pin, said anvil having a plurality of holes in the side thereof, a locking pin extending through one of the extensions of the hand grip and adapted to move into one of the holes in the side of said rotary anvil, and wings on said bearing pin for rotating it to move said locking pin into or out of any one of the holes in said anvil for the purpose specified.

10. In a saw-set having a head adapted to set teeth of a saw, a soft metal guard for engaging and protecting the saw teeth.

11. In a saw-set having a head adapted to set teeth of a saw, soft metal guards loosely connected to the head for engaging and protecting the saw teeth.

12. In a saw-set having a head adapted to set teeth of a saw, soft metal guards pivotally connected to and on opposite sides of the head for engaging and protecting the saw teeth.

13. In a saw-set having a head adapted to set teeth of a saw, soft metal guards pivotally connected to and disposed on opposite sides of the head, said guards having their loose ends extending at right angle to their pivoted ends.

14. In a saw-set adapted to set teeth of a saw, a head having integrally connected thereto one member of a hand grip, another member of a hand grip pivotally connected to the head, and finger guards on the members of the hand grip.

15. In a saw-set an anvil holder; an anvil pivoted to said holder and having saw blade contacting and saw tooth stopping faces, transverse faces of which faces extend in parallelism with the pivot axis of the anvil; means to fix the anvil relative to the holder; a handle pivoted to the holder, a bit to coöperate with the anvil to set a saw; a bit carrier pivotally connected to the handle and to the bit to effect such coöperation when the handle is operated; and means to guide said carrier.

16. A saw-set comprising an anvil; a handle therefor provided with a guide-way; a bit carrier provided with a guide operable in such guide-way toward and from the anvil; a bit pivoted to the carrier; and a handle pivoted to the carrier and to the anvil handle.

17. A saw-set comprising a pivoted carrier having a socket; a bit movably mounted in, and fitted to, said socket and means for moving the carrier to actuate the bit.

18. A saw-set comprising a carrier having a socket in one end; a guide for the other end of the carrier; a bit movably mounted in said carrier; and means for moving said carrier in the guide to actuate the bit.

19. In a saw-set, a carrier having a socket; a bit fitted to and mounted in the socket and thereby pivotally connected to the carrier and a hand grip for moving said carrier to actuate said bit.

20. In a saw-set; a carrier having a socket in one end; a bit mounted in said socket and thereby pivotally connected to the carrier; an anvil and means for moving said carrier to cause said bit to accommodate itself to and to coöperate with said anvil to set a saw.

21. In a saw-set, a carrier having a socket; a bit removably and pivotally fitted to and mounted in said socket; an anvil adjacent the bit, and means for moving the carrier to move the bit toward and away from said anvil.

22. In a saw-set; a carrier having a recess in one end; a bit removably and pivotally mounted in the recess; a rotary anvil adjacent said bit; there being faces on said anvil adapted to abut the side of a saw, and to stop a saw tooth at an angle thereto; and a hand grip for moving said bit toward and from the anvil and at an acute angle to said plane.

23. In a saw-set; a bit; a carrier having a recess in one end in which said bit is removably and pivotally mounted; a guide at the other end of said carrier, a rotary anvil adjacent said bit, said anvil having thereon a plurality of planes adapted to abut a saw blade; said anvil being pivoted on its axis to bring such planes successively into abutting position with a saw blade; means for holding the anvil fixed in such abutting positions, respectively, and a hand grip for actuating the carrier to move the bit toward and from the plane that is positioned to abut a saw; said hand grip, when in operation being positioned below the level of said anvil and at an acute angle to the plane that is positioned to abut a saw.

24. The combination with a saw-set anvil; of a handle therefor provided with a guideway; a saw setting bit; a carrier guided by said guideway and pivotally connected to said bit; and a handle pivotally connected to the anvil handle and to the carrier to operate said carrier to move said saw setting bit toward and from the anvil.

In testimony whereof, I have hereunto set my hand at Los Angeles, California, this 10th day of December, 1919.

EDGAR A. YOUNG.

Witness:
JAMES R. TOWNSEND.